(12) United States Patent
Kachnic

(10) Patent No.: US 7,033,159 B2
(45) Date of Patent: Apr. 25, 2006

(54) METHOD FOR PART-FORMING MACHINE HAVING AN IN-MOLD INTEGRATED VISION SYSTEM

(75) Inventor: Edward F. Kachnic, Douglasville, GA (US)

(73) Assignee: Avalon Vision Solutions, LLC, Lithia Springs, GA (US)

( * ) Notice: Subject to any disclaimer, the term of this patent is extended or adjusted under 35 U.S.C. 154(b) by 330 days.

(21) Appl. No.: 10/441,338

(22) Filed: May 20, 2003

(65) Prior Publication Data

US 2003/0206986 A1    Nov. 6, 2003

Related U.S. Application Data

(62) Division of application No. 09/738,602, filed on Dec. 16, 2000, now Pat. No. 6,592,355.

(51) Int. Cl.
    B29C 45/76    (2006.01)
(52) U.S. Cl. .......................... 425/169; 425/136
(58) Field of Classification Search ............... 425/136, 425/137, 139, 165, 169; 264/40.1, 334
    See application file for complete search history.

(56) References Cited

U.S. PATENT DOCUMENTS

| | | |
|---|---|---|
| 3,303,537 A | 2/1967 | Mislan |
| 3,642,401 A | 2/1972 | Wilson |
| 4,236,181 A | 11/1980 | Shibata et al. |
| 4,358,186 A | 11/1982 | Johnson et al. |
| 4,603,329 A | 7/1986 | Bangerter et al. |
| 4,841,364 A | 6/1989 | Kosaka et al. |
| 5,062,052 A | 10/1991 | Sparer et al. |
| 5,062,053 A | 10/1991 | Shirai et al. |
| 5,223,191 A | 6/1993 | Tatsuno et al. |
| 5,243,665 A | 9/1993 | Maney et al. |
| 5,470,218 A | 11/1995 | Hillman et al. |
| 5,567,366 A | 10/1996 | Motegi et al. |
| 5,768,138 A | 6/1998 | Ruotolo |
| 5,815,397 A | 9/1998 | Saito et al. |
| 5,891,383 A | 4/1999 | Joseph |
| 5,898,591 A | 4/1999 | Hettinga et al. |
| 5,928,578 A | 7/1999 | Kachnic et al. |
| 5,940,139 A | 8/1999 | Smoot |
| 5,978,578 A | 11/1999 | Azarya et al. |
| 6,024,902 A | 2/2000 | Maus et al. |
| 6,051,170 A | 4/2000 | Kamiguchi et al. |
| 6,226,395 B1 | 5/2001 | Gilliland |
| 6,258,303 B1 | 7/2001 | Hibi et al. |
| 6,275,741 B1 | 8/2001 | Choi |

(Continued)

FOREIGN PATENT DOCUMENTS

WO    WO 01/98050 A1    12/2001

(Continued)

Primary Examiner—Duane Smith
Assistant Examiner—Emmanuel S. Luk
(74) Attorney, Agent, or Firm—Myers & Kaplan, LLC; Sandra M. Drummond, Esq.; Joel D. Myers, Esq.

(57) ABSTRACT

A part-forming machine having an in-mold integrated vision system and method therefor for verifying the presence, absence and quality of molded parts therein. The image of the mold and/or part is acquired at a substantially parallel angle relative to the image-capturing source thereby allowing the imaging of the mold while the mold is opening thus increasing the resolution, speed and accuracy of part-forming machine imaging systems.

1 Claim, 9 Drawing Sheets

U.S. PATENT DOCUMENTS 6,592,354 B1 7/2003 Kachnic et al.
6,592,355 B1 7/2003 Kachnic
2003/0065420 A1 4/2003 Kachnic et al.

FOREIGN PATENT DOCUMENTS

WO WO 02/43939 A1 6/2002
WO WO 02/47884 A1 6/2002

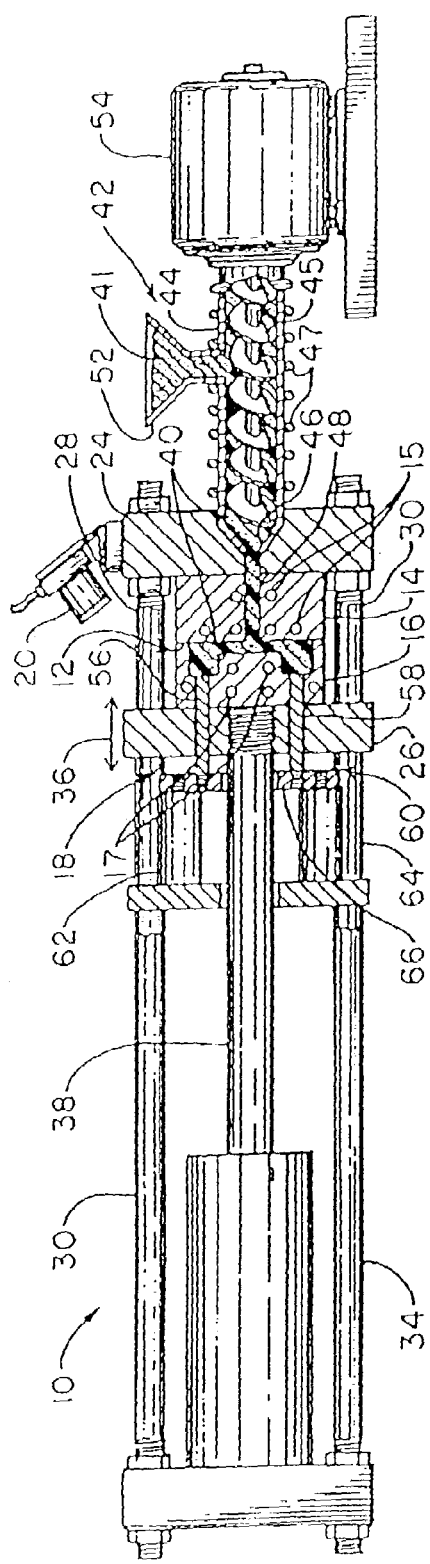

FIG. 10     410

METHOD FOR PART-FORMING MACHINE HAVING AN IN-MOLD INTEGRATED VISION SYSTEM

CROSS-REFERENCE AND PRIORITY CLAIM TO RELATED APPLICATION

To the full extent permitted by law, the present application claims priority to and the benefit as a divisional application to non-provisional patent application entitled "Part-Forming Machine Having and In-Mold Integrated Vision System and Method Therefor" filed on Dec. 16, 2000, having assigned Ser. No. 09/738,602, now U.S. Pat. No. 6,592,355.

TECHNICAL FIELD

The present invention relates generally to part-forming machines, and more specifically to a part-forming machine having an in-mold integrated vision system and a method therefor.

BACKGROUND OF THE INVENTION

The parts forming industry is one of the world's largest industries in both total revenue and employment. As a multi-billion dollar industry, even small improvements to the manufacturing process can prove to have an enormous efficiency and thus financial impact. Numerous methods and machines have been designed for forming parts. For instance, parts are generally formed via molds, dies and/or by thermal shaping, wherein the use of molds is presently the most widely utilized. There are many methods of forming a part via a mold, such as, for exemplary purposes only, stretch-blow molding, extrusion blow molding, injection blow molding, vacuum molding, rotary molding and injection molding.

One typical method of forming hollow containers is via a widely utilized process known as stretch blow-molding, wherein typically a three piece mold having two opposing side members and a bottom/push-up mold is utilized. Commonly, an injection molded preform, shaped generally like a test tube (also known as the parison), is inserted into the top of the mold. A rod is inserted inside the parison and is utilized to extend the parison to the bottom of the mold, upon which compressed air is forced into the parison, thus stretching the parison outward first toward the approximate center of the side mold members and then over and around the push-up/bottom mold. The parison is generally amorphous prior to initiating the blow process; however, after stretching the parison, the molecules align thereby forming a container having high tensile strength.

An even more popular method is the forming of parts utilizing a technique known as injection molding. Injection molding systems are typically used for molding plastic and some metal parts by forcing liquid or molten plastic materials or powdered metal in a plastic binder matrix into specially shaped cavities in molds where the plastic or plastic binder matrix is cooled and cured to make a solid part. For purposes of convenience, references herein to plastic and plastic injection molds are understood to also apply to powdered metal injection molding and other materials from which shaped parts are made by injection molding, even if they are not mentioned or described specifically.

A typical injection mold is made in two separable portions or mold halves that are configured to form a desired interior mold cavity or plurality of cavities when the two mold halves are mated or positioned together. Then, after liquid or molten plastic is injected into the mold to fill the interior mold cavity or cavities and allowed to cool or cure to harden into a hard plastic part or several parts, depending on the number of cavities, the two mold halves are separated to expose the hard plastic part or parts so that the part or parts can be removed from the interior mold cavity or cavities.

In many automated injection molding systems, ejector apparatus are provided to dislodge and push the hard plastic parts out of the mold cavities. A typical ejector apparatus includes one or more elongated ejector rods extending through a mold half into the cavity or cavities and an actuator connected to the rod or rods for sliding or stroking them longitudinally into the cavity or cavities to push the hard plastic part or parts out of the cavity or cavities. However, other kinds of ejector apparatus, such as robotic arms, scrapers, or other devices may also be used. Such ejectors are usually quite effective for dislodging and pushing hard plastic parts out of mold cavities, but they are not foolproof. It is not unusual for an occasional hard plastic part to stick or hang-up in a mold cavity in spite of an actuated ejector. One quite common technique is to design and set the ejectors to actuate or stroke multiple times in rapid succession, such as four or five cycles each time a hard plastic part is to be removed, so that if a part sticks or is not removed from a mold cavity the first time it is pushed by an ejector, perhaps it can be dislodged by one or more subsequent hits or pushes from the ejectors. Such multiple ejector cycles are often effective to dislodge and clear the hard molded plastic parts from the molds. Disadvantages of multiple ejector cycling, however, include the additional time required for the multiple ejector cycling each time the mold is opened to eject a hardened plastic part before it is closed for injection of a subsequent part and the additional wear and tear on the ejector equipment and the molds occasioned by such multiple cycling. Over the course of days, weeks, and months of injection molding parts in repetitive, high volume production line operations, such additional time, wear, and tear can be significant production quantity and cost factors.

On the other hand, stuck or incompletely ejected hard plastic parts can also cause substantial damage to molds and lost production time. In most injection mold production lines, the injection molding machines operate automatically, once the desired mold is installed, in continuous repetitive cycles of closing the mold halves together, heating them, injecting liquid or molten plastic into the mold cavities, cooling to cure or harden the plastic in the mold into hard plastic parts, opening or separating the mold halves, ejecting the molded hard plastic parts, and closing the mold halves together again to mold another part or set of parts. Very high injection pressures are required to inject the liquid or molten plastic into the mold cavities to completely fill all portions of the cavities in a timely manner, and such high pressures tend to push the mold halves apart during injection of the plastic. To prevent such separation of the mold halves during plastic injection, most injection molding machines have very powerful mechanical or hydraulic rams to push and hold the mold halves together. If a hard plastic part from the previous cycle is not ejected and completely removed from between the mold halves, the powerful mechanical or hydraulic rams will try to close the mold halves onto the hard plastic part, which can and often does damage one or both of the mold halves. Molds are usually machined very precisely from stainless steel or other hard metal, so they are very expensive to replace, and the down-time required to change them is also costly in labor and lost production. It is also not unusual for some of the plastic in a mold cavity to break apart from the rest of the part being molded in the cavity and remain in the mold cavity when the rest of the molded part is ejected. Such remaining material will prevent proper filling and molding of subsequent parts in the cavity, thus causing the subsequent molded parts to be defective. In automated production lines, substantial numbers of such defective parts can be produced before someone detects them and shuts down the injection molding machine for correction of the problem.

To avoid such mold damage, down-time, and defective molded parts as described above, various technologies have also been developed and used to sense or determine whether the hard molded plastic parts have indeed been dislodged and completely ejected or removed from the molds before the mechanical or hydraulic rams are allowed to close. Such technologies have included light beam sensors, vision systems, air pressure sensors, vacuum sensors, and others. U.S. Pat. No. 4,841,364 issued to Kosaka et al. is exemplary of a vision system in which video cameras connected to a vision system controller take video images of the open mold halves for computerized comparison to video images of the empty mold halves stored in memory to detect any unremoved plastic parts or residual plastic material in the mold halves. U.S. Pat. No. 4,236,181 issued to Shibata et al. is also an example of a vision system wherein photosensors are provided on a face plate of a CRT to electrically detect if a part has been removed.

As an improvement to the above systems, U.S. Pat. No. 5,928,578 issued to Kachnic et al. provides a skip-eject system for an injection molding machine, wherein the system comprises a vision system for acquiring an actual image of an open mold after a part ejector has operated and a controller for comparing such actual image with an ideal image of the open mold to determine if the part still remains in the mold. If so, the controller outputs an ejector signal to actuate the ejector to cycle again. Additionally, the patents to Kachnic et al., Kosaka et al. and Shibata et al. provide a means for inspecting the part for defects.

However, in view of the present system and method, the prior systems are disadvantageous. More specifically, the above systems have typically utilized charge coupled device (CCD) cameras positioned on the top or sides of the mold to acquire an image of the mold. This requires that the mold be completely opened before an image can be acquired, thus slowing down the inspection process. Moreover, due to the angle of the sensing device relative to the mold, a skewed image is acquired thereby resulting in decreased resolution of the image and increased inspection error.

Therefore, it is readily apparent that there is a need for a part-forming machine having an in-mold integrated vision sensor and method therefor that provides an image that is acquired at a relatively parallel angle from the sensor and thus provides more accurate detection resolution. It is, therefore, to the provision of such an improvement that the present invention is directed.

SUMMARY OF THE INVENTION

According to its major aspects and broadly stated, the present invention is a part-forming machine having an in-mold integrated vision sensor and method therefor for verifying the presence, absence and quality of molded parts therein.

Thus, a feature and advantage of the present invention is to provide a new and improved part-forming machine having an in-mold integrated vision sensor that captures images of the mold and/or part at relatively parallel angles and determines the presence, absence and/or quality of the molded part.

Another feature and advantage of the present invention is to provide a new and improved part-forming machine having an in-mold integrated vision sensor that captures images of the mold and/or part at relatively parallel angles thereby eliminating angled views and thus increasing the resolution of the images by reducing the view area of each pixel.

Another feature and advantage of the present invention is to provide a new and improved part-forming machine having an in-mold integrated vision sensor that captures images of the mold and/or part at relatively parallel angles and reduces the number of false rejections and/or false confirmations found in prior systems.

Another feature and advantage of the present invention is to provide a new and improved part-forming machine having an in-mold integrated vision sensor that captures images of the mold and/or part at relatively parallel angles and thereby increases the accuracy of vision inspection systems thus increasing the efficiency of the part-forming process.

Another feature and advantage of the present invention is to provide a new and improved part-forming machine having an in-mold integrated vision sensor that captures images of the mold and/or part at relatively parallel angles, thus increasing image resolution and thereby allowing the vision system to analyze a tighter tolerance in variations in the process, resulting in an improved vision system and molding process.

Another feature and advantage of the present invention is to provide a new and improved part-forming machine having an in-mold integrated vision sensor that captures images of the mold and/or part at relatively parallel angles and provides a lighting source that is applied at relatively parallel angles thus increasing illumination consistency and thereby allowing clearer image acquisition.

Another feature and advantage of the present invention is to provide a new and improved part-forming machine having an in-mold integrated vision sensor that captures images of the mold and/or part at relatively parallel angles thereby allowing the image to be acquired prior to the complete opening of the mold, thus increasing the speed of the machine.

Another feature and advantage of the present invention is to provide a new and improved part-forming machine having an in-mold integrated vision sensor that captures images of the mold and/or part at relatively parallel angles, wherein coherent fiber optic bundles or cables are utilized to transfer the image to a sensor.

Another feature and advantage of the present invention is to provide a new and improved part-forming machine having an in-mold integrated vision sensor that captures images of the mold and/or part at relatively parallel angles, wherein an illumination source illuminates the mold and/or part via a fiber optic cable or bundle.

Another feature and advantage of the present invention is to provide a new and improved part-forming machine having an in-mold integrated vision sensor that captures images of the mold and/or part at relatively parallel angles thereby allowing the images to be acquired prior to the complete opening of the mold and further allowing parts to be ejected during the opening process and images acquired immediately thereafter.

Another feature and advantage of the present invention is to provide a new and improved part-forming machine having an in-mold integrated vision sensor that captures images of the mold and/or part at relatively parallel angles thus allowing the sensing device to more quickly focus on the image than in an angled view.

Another feature and advantage of the present invention is to provide a new and improved method for verifying the presence, absence and quality of molded parts in a part-forming machine wherein the part-forming machine utilizes an in-mold sensor to acquire images of the mold and/or part at relatively parallel angles thereto.

Another feature and advantage of the present invention is to provide a new and improved method for verifying the presence, absence and quality of molded parts in a part-forming machine, wherein the part-forming machine utilizes an in-mold sensor, and wherein the process is more efficient and accurate over prior-art methods.

Another feature and advantage of the present invention is to provide a new and improved method for verifying the presence, absence and quality of molded parts in a part-forming machine, wherein the part-forming machine utilizes an in-mold sensor thus allowing images to be acquired during the mold-opening process.

Another feature and advantage of the present invention is to provide a new and improved method for verifying the presence, absence and quality of molded parts in a part-forming machine, wherein the part-forming machine utilizes an in-mold sensor to acquire images at relatively parallel positions thus allowing quicker focus or sensing of the part and/or mold.

These and other objects, features and advantages of the invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Alternate Embodiments with reference to the accompanying drawing figures, in which like reference numerals denote similar structure and refer to like elements throughout, and in which:

FIG. 2 is a partial cross-sectional side elevation view of the injection molding machine of FIG. 1 showing the ejectors retracted;

FIG. 3 is a partial cross-sectional side elevation view of the injection molding machine of FIG. 1 showing the ejectors extended;

FIG. 10 is a plane view of a representative pixel grid area of the present invention showing the reduced view area of each pixel.

DETAILED DESCRIPTION OF THE PREFERRED AND ALTERNATE EMBODIMENTS

Figure 1:
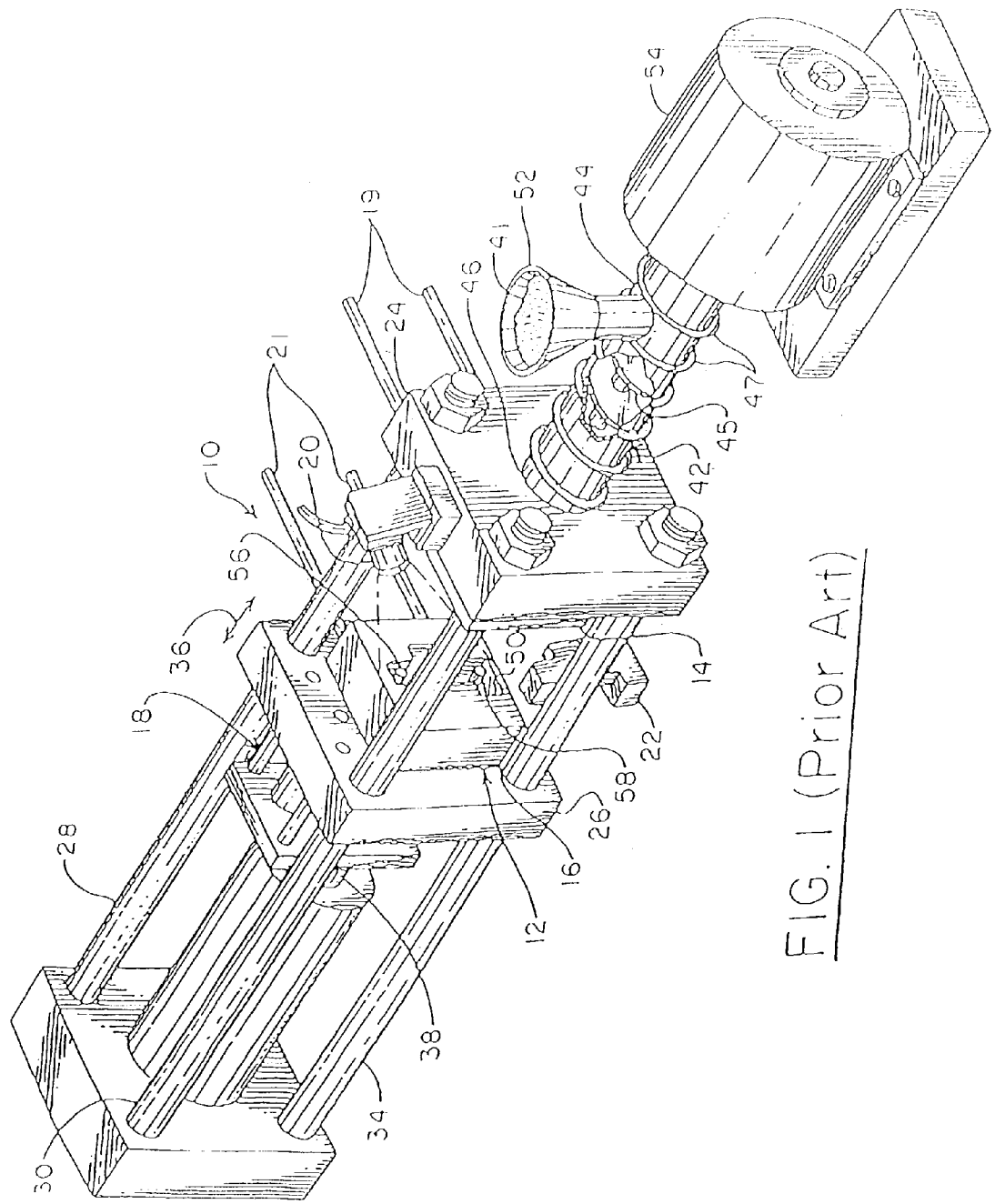
FIG. 1 is a perspective view of a typical prior-art injection molding machine equipped with a vision detection system positioned on the top of the mold.

In describing the preferred embodiment of the present invention illustrated in the figures, specific terminology is employed for the sake of clarity. The invention, however, is not intended to be limited to the specific terminology so selected, and it is to be understood that each specific element includes all technical equivalents that operate in a similar manner to accomplish similar functions.

With regard to all such embodiments as may be herein described and contemplated, it will be appreciated that optional features, including, but not limited to, aesthetically pleasing coloration and surface design, and labeling and brand marking, may be provided in association with the present invention, all without departing from the scope of the invention.

To better understand the present system and method of this invention, a rudimentary knowledge of a typical prior-art injection molding machine and process is helpful. Therefore, referring first to FIGS. 1–3, a conventional automated injection molding machine 10 is shown equipped with a mold 12 comprising two mold halves 14, 16, a sliding rod-type ejector system 18, and camera 20 for acquiring visual images of the open mold half 14 in electronic format that can be digitized, stored in memory, and processed to detect presence or absence of a plastic part or material in the mold half 14.

In general, the exemplary conventional injection molding machine 10 comprises two platens 24, 26 mounted on a frame made of four elongated, quite substantial frame rods 28, 30, 32, 34 for mounting the two halves 14, 16 of mold 12. The stationary platen 24 is immovably attached to rods 28, 30, 32, 34, while the moveable platen 26 is slidably mounted on the rods 28, 30, 32, 34 so that it can be moved back and forth, as indicated by arrow 36, in relation to the stationary platen 24. Therefore, the mold half 16 mounted on moveable platen 26 is also moveable as indicated by arrow 36 in relation to the other mold half 14 that is mounted on stationary platen 24. A large hydraulic or mechanical ram 38, which is capable of exerting a substantial axial force, is connected to the moveable platen 26 for moving the mold half 16 into contact with mold half 14 and holding them together very tightly while liquid or molten plastic 40 is injected into mold 12, as best seen in FIG. 2. Most molds 12 also include internal ducts 15, 17 for circulating heating and cooling fluid, such as hot and cold water, through the respective mold halves 14, 16. Cooling fluid supply hoses 19, 21 connect the respective ducts 15, 17 to fluid source and pumping systems (not shown). Hot fluid is usually circulated through ducts 15, 17 to keep the mold 12 hot during the injection of liquid or molten plastic 40 into cavity 50. Then cold fluid is circulated through ducts 15, 17 to cool the mold 12 to allow the liquid or molten plastic 40 to solidify into the hard plastic part 22 that is shown in FIG. 3. A typical plastic injector or extrusion system 42 may comprise an injector tube 44 with an auger 45 in the tube 44 for forcing the liquid or molten plastic 40 through an aperture 46 in the stationary platen 24 and through a duct 48 in mold half 14 into a mold cavity 50 that is machined or otherwise formed in mold half 16. In many applications, there are more cavities than one in the mold 12 for molding cycle. In such multiple cavity molds, multiple ejectors may be required to eject the hard molded parts from all of the cavities. The plastic extrusion system 42 also includes a hopper or funnel 52 for filling the tube 44 with the granular solid plastic 41, a heating coil 47 or other heating system disposed around the tube 44 for heating the granular plastic 41 enough to melt it in the tube 44 to liquid or molten plastic 40, and a motor 54 for driving the auger 46.

After the liquid or molten plastic 40 is injected into the mold 12 to fill the mold cavity 50, as illustrated in FIG. 2, and after the plastic 40 in the mold cavity has solidified as described above, the ram 38 is actuated to pull the mold half 16 away from the mold half 14 so that the hard plastic part 22 can be ejected from mold cavity 50. Once the mold halves 14, 16 are completely separated, the part-forming machine controller 72 sends a signal to the camera 20 to acquire a first image of the mold half 16, wherein the image is analyzed to ensure the presence of the part 22 in the mold half 16. Ejection of the hard plastic part 22, as mentioned above, can be accomplished by a variety of mechanisms or processes that can be made more efficient and effective by this invention, and the ejector system 18 illustrated in FIGS. 1–3 is but one example that is convenient for describing this invention. The ejector system 18 includes two slidable ejector rods 56, 58 that extend through the moveable platen 26 and through mold half 16 into mold cavity 50. When the mold 12 is closed for filling the mold cavity 50 with plastic 40, as shown in FIG. 2, the ejector rods 56, 58 extend to, but not into the mold cavity. However, when the mold 12 is opened, as shown in FIG. 3, an ejector actuator 60, which comprises two small hydraulic cylinders 62, 66 and a cross bar 68 connected to the ejector rods 56, 58, pushes the ejector rods 56, 58 into the mold cavity 50 to hit and dislodge the hard plastic part 22 and push it out of the cavity 50. Because one hit or push by the ejector rods 56, 58 is occasionally not enough to dislodge and push the hard plastic part 22 all the way out of the cavity 50, it is a common practice to cycle the ejector actuator 60 several times to cause the ejector rods 56, 58 to reciprocate into and out of the cavity 50 repetitively so that, if the hard plastic part 22 is still in the cavity, it will get hit and pushed several times, thus reducing instances when the hard plastic part 22 does not get completely ejected to a minimum. Next the part-forming machine controller 72 sends a signal to the camera 20 to acquire an image of the mold half 16, including the cavity 50, and then the image is sent in electronic form to an image processing system, where it is digitized and compared by a computer or microprocessor to an ideal image of the mold half 16 and empty mold cavity 50. If the image comparison shows that the mold cavity 50 is empty and that the hard plastic part 22 has been cleared from the mold half 16, the ram 38 is actuated to close the mold 12 to start a new molding cycle. On the other hand, if the image comparison shows that the hard plastic part 22 has not been dislodged from the cavity 50 or cleared from the mold half 16, then the ram 38 is not allowed to close the mold 12, and a signal is generated to notify an operator to check the mold, clear any residual plastic or the hard plastic part 22 from the cavity 50 and mold 12, and then restart the plastic injection molding machine 10.

As discussed above, the repetitive cycling of the ejector rods 56, 58 that is practiced in some conventional injection molding systems reduces occurrences of the hard plastic part 22 not being dislodged from the cavity 50 and removed from the mold half 16. However, for the many instances when one hit or push by the ejector rods 56, 58 would be sufficient to dislodge and remove the hard plastic part 22, which far outnumber the instances when additional hits or pushes by the ejector rods 56, 58 are necessary, the repetitive cycling of the ejector system 18 every time the mold 12 is opened also takes unnecessary time and causes unnecessary wear and tear on the ejector system 18 and mold 12. As an improvement, a skip-eject system, as found in U.S. Pat. No. 5,928,578 to Kachnic et al., is typically utilized, wherein the ejector system 18 is actuated only when necessary. For instance, instead of using a large, fixed number of ejector rod 56, 58 strokes or cycles for every time the mold 12 is opened in plastic part molding cycles, a variable number of ejector rod 56, 58 strokes is used to match each molding cycles ejection needs. The repetition of stroke cycles is dependent on the image of the mold 12 as obtained via the camera 20.

Figure 7:
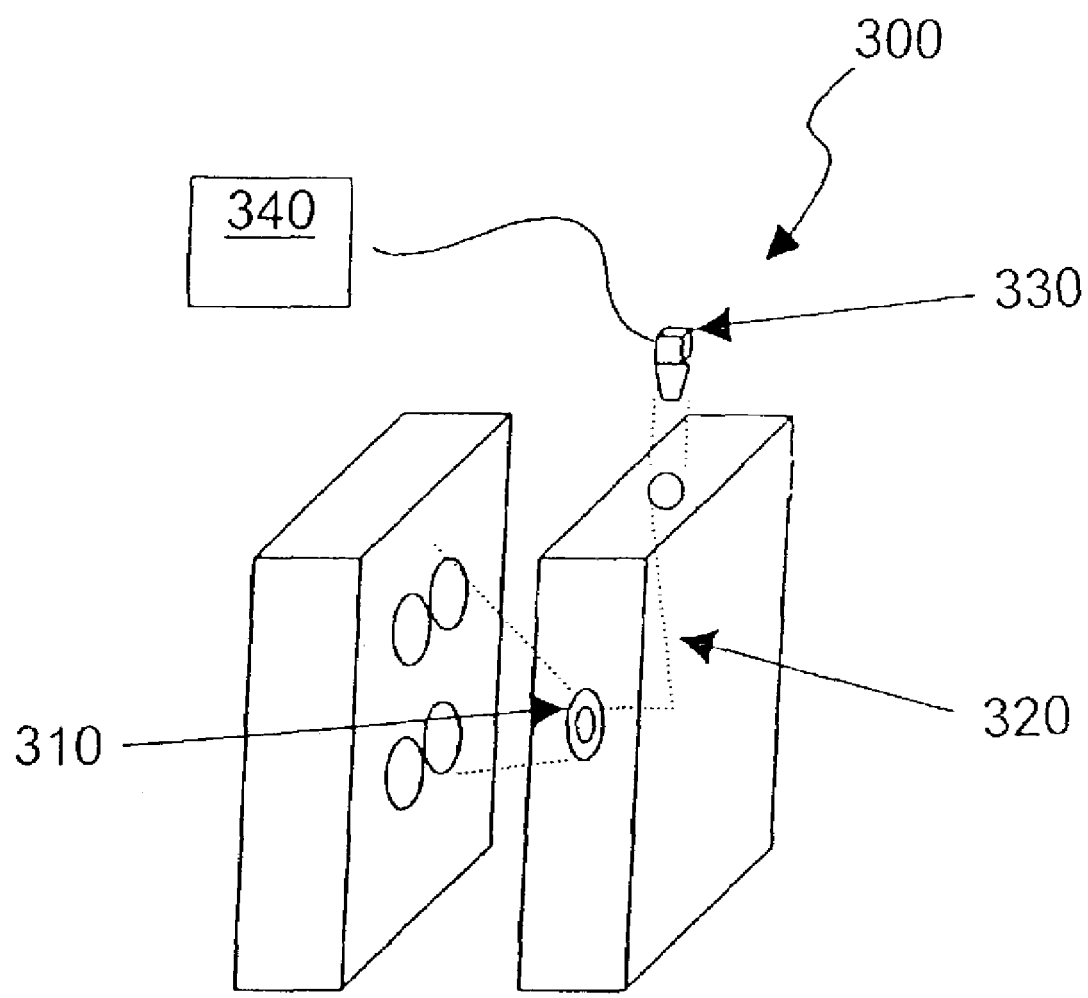
FIG. 7 is a partial perspective view of the present invention shown in a preferred embodiment.
Figure 8:
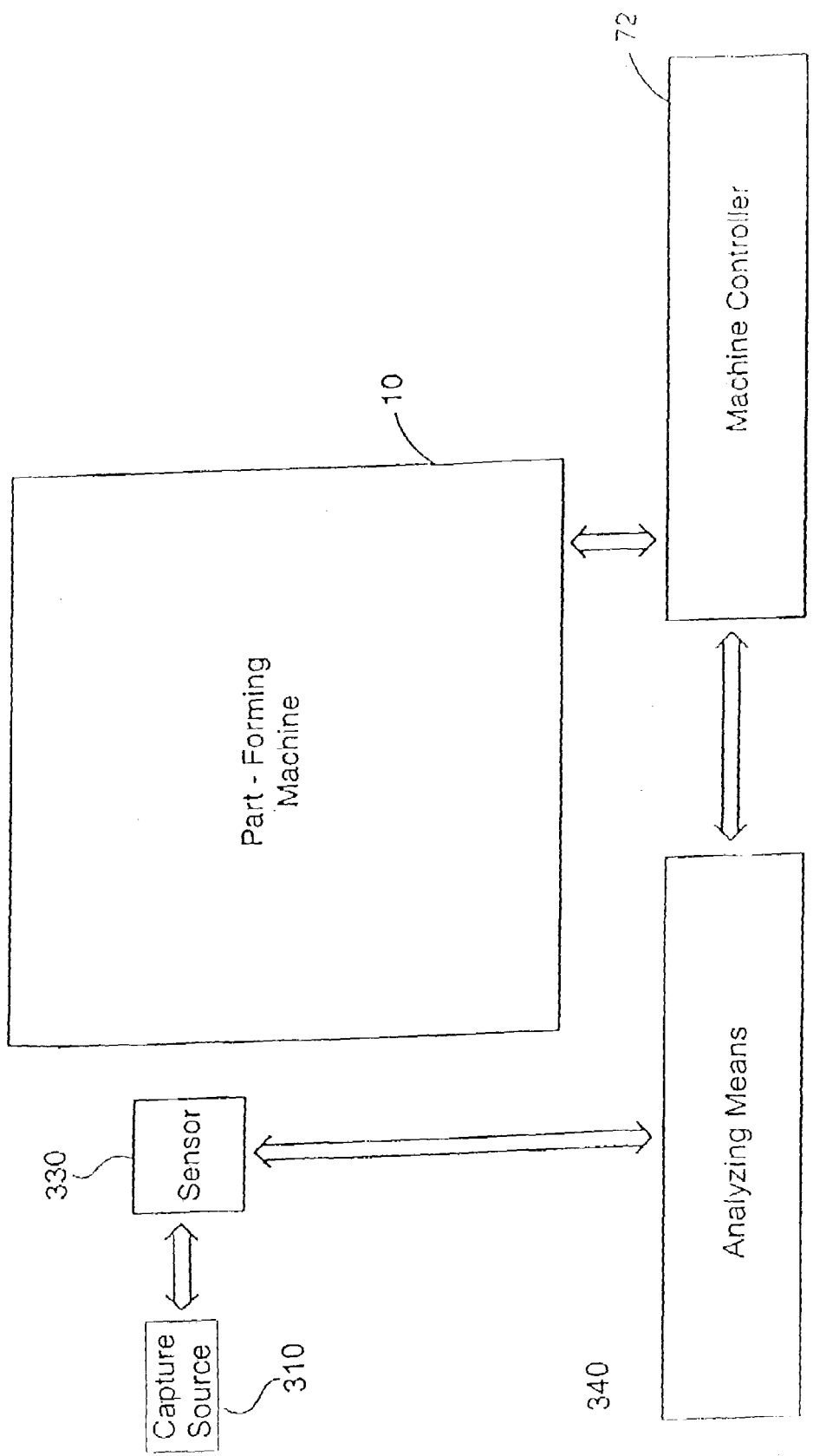
FIG. 8 is a functional block diagram of a control of the machine controller and analyzing means according to the present invention shown in a preferred embodiment.

In the preferred embodiment of the present invention, as shown in FIGS. 7–8, sensing system 300 comprises an image capture source 310, a linking member 320, a sensor device 330 and a analyzing means 340, wherein the analyzing means 340 is preferably a computer or microprocessor. Image capture source 310 is positioned preferably at the center of mold half 14 facing to the surface of mold half 16 such that mold half 16 and any parts therein are generally at an approximately parallel angle relative to the image capture source 310. However, it should be noted that in alternate embodiments image capture source 310 may be positioned at various locations within the mold such that various parts or specific areas of parts may be imaged at a substantially parallel angle. It is also contemplated that any number of image capture sources 310 may be positioned at various positions within the mold to increase resolution and/or to improve the image analysis process. Image capture source 310 is, preferably, a coherent fiber optic bundle, wherein light waves and/or radiation can be captured thereby and allowed to travel therethrough to sensor device 330 via linking member 320. Linking member 320 is also preferably coherent fiber optic bundles. The coherent fiber optic bundles allow the image of the mold half 16 and/or part 22 to be viewed remotely by sensor device 330, thus preventing the sensor device from being exposed to the high temperatures of the mold. Preferably the sensor device 330 is positioned on the exterior of the mold half 14; however, in alternate embodiments, the sensor device 330 may be positioned at a further remote location or within one of the mold halves 14, 16 at a lower temperature point from the part-forming area such that the sensor device 330 is not damaged by the high temperatures. It is also contemplated that the sensor device 330 may be thermally insulated and/or have various known heat removal systems to protect the sensor device 330 and thus allow it to be positioned within the mold.

The sensor device 330 is preferably a charge coupled device(CCD) array electronic camera. However, in alternate embodiments, the sensor device 330 may be any sensing device such as, for exemplary purposes only, an infrared or near infrared camera or infrared heat sensor.

In the preferred embodiment, the analyzing means 340 receives an electronic representation of the acquired image from the sensor device 330, analyzes said image and communicates the presence or absence of molded parts within the mold 12 to the part-forming machine controller 72. Given known parameters, one skilled in the art would be able to develop software for analyzing the images of the mold 12. The analyzing means 340 is preferably integrated with the part-forming machine controller 72; however, a separate controller/computer may be utilized that is communicationally linked with the part-forming machine controller 72.

Due to the generally parallel positioning of the capture source 310, as soon as the sensor device 330 receives a signal from the machine controller 72 that the mold is beginning to open, the first image is immediately acquired while the mold 12 is opening, in lieu of waiting for a signal from the machine controller 72 that the mold 12 has completely opened. The image is then analyzed to ensure that the part 22 is present on the moving side of the mold half 16; the analyzing means 340 sends a signal to the machine controller 72 to this affect. Next, a first cycle of ejector rods 56, 58 is performed. This step can now be performed while the mold 12 is opening. A second image is acquired and analyzed to determine the absence of the part 22 in mold half 16, wherein if the part 22 is still present, another series of ejector rods 56, 58 is performed or an alarm is activated, depending on the number of cycles performed, to indicate to the operator that the part 22 is stuck. If the second image indicates that the part 22 is absent, the analyzing means 340 sends a signal to the machine controller 72 to close the mold 12 and begin the next molding process.

Figure 4:
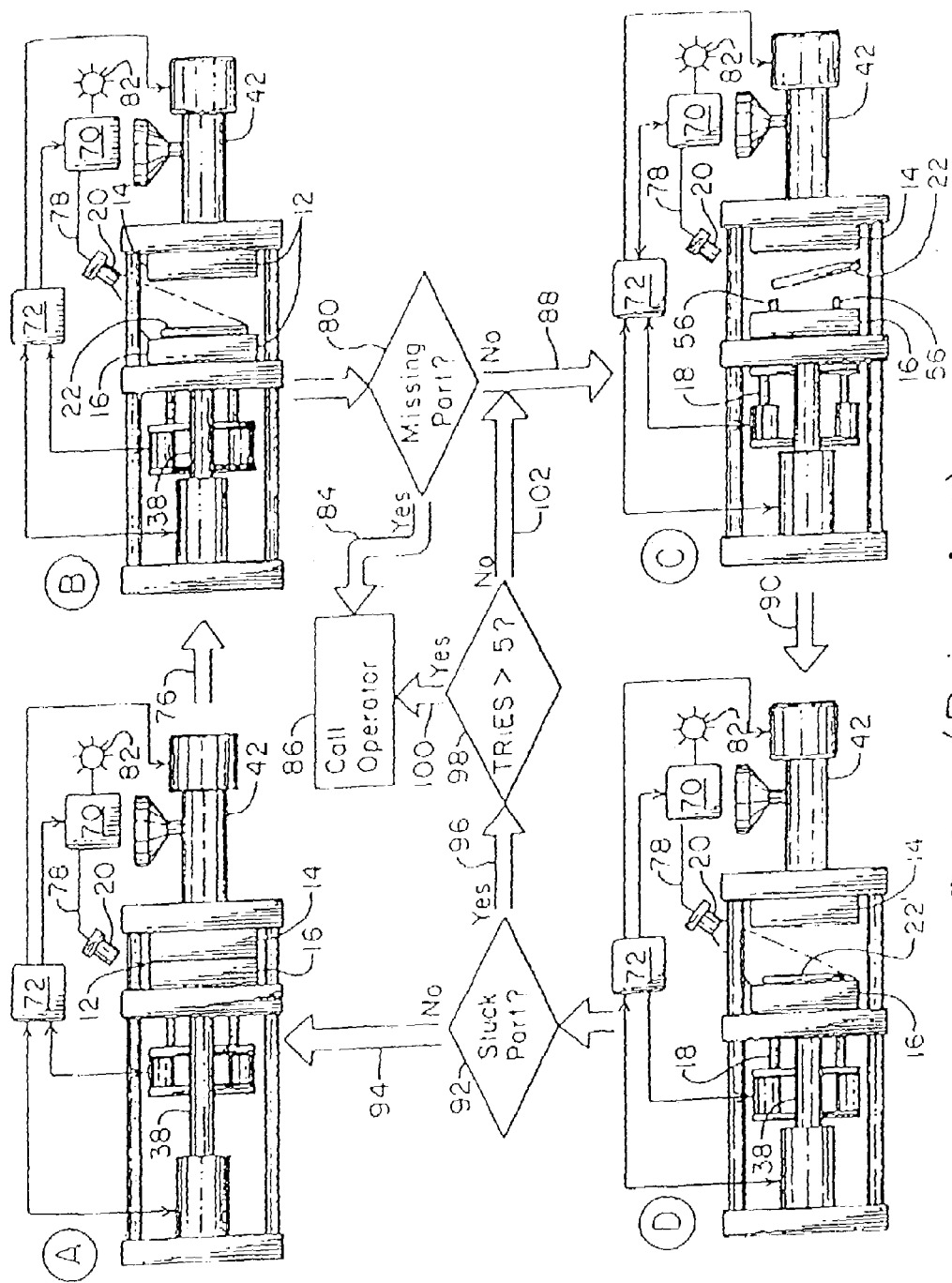
FIG. 4 is a diagrammatic representation of the flow logic of a prior art system known as the skip-eject system.
Figure 5:
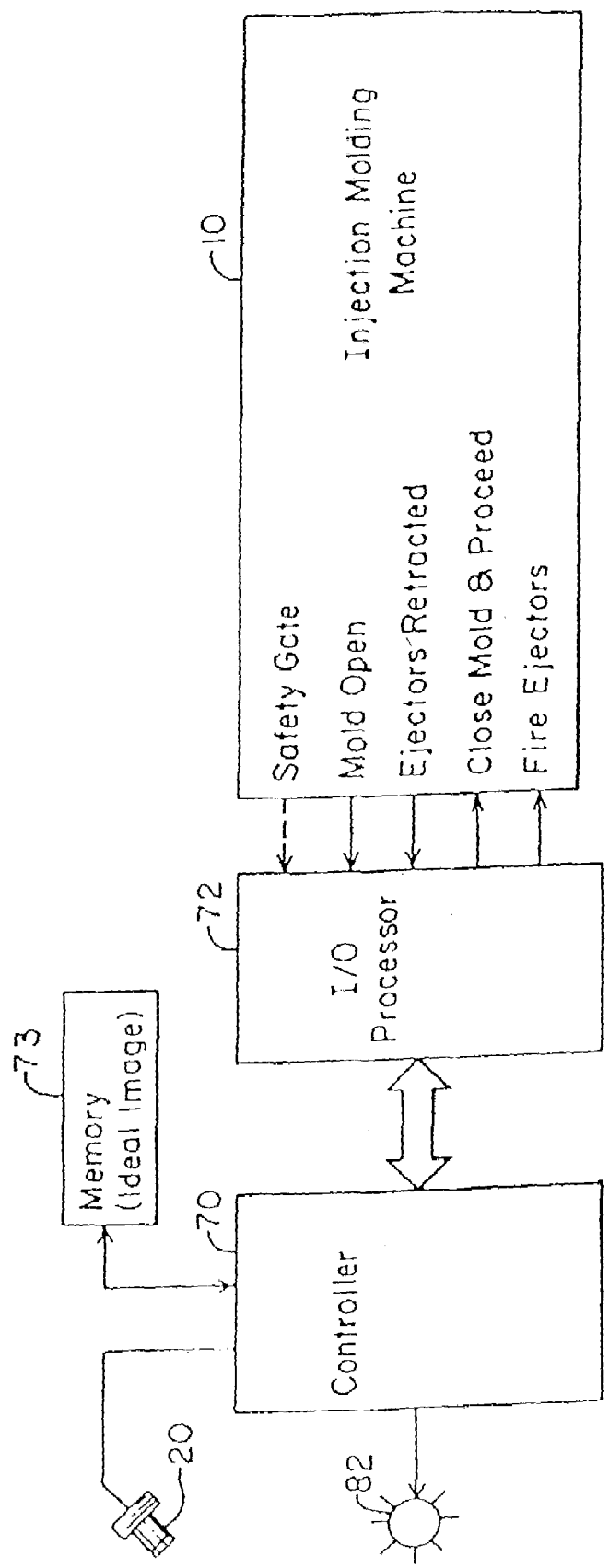
FIG. 5 is a functional block diagram of a control of a prior-art system known as the skip-eject system.
Figure 6:
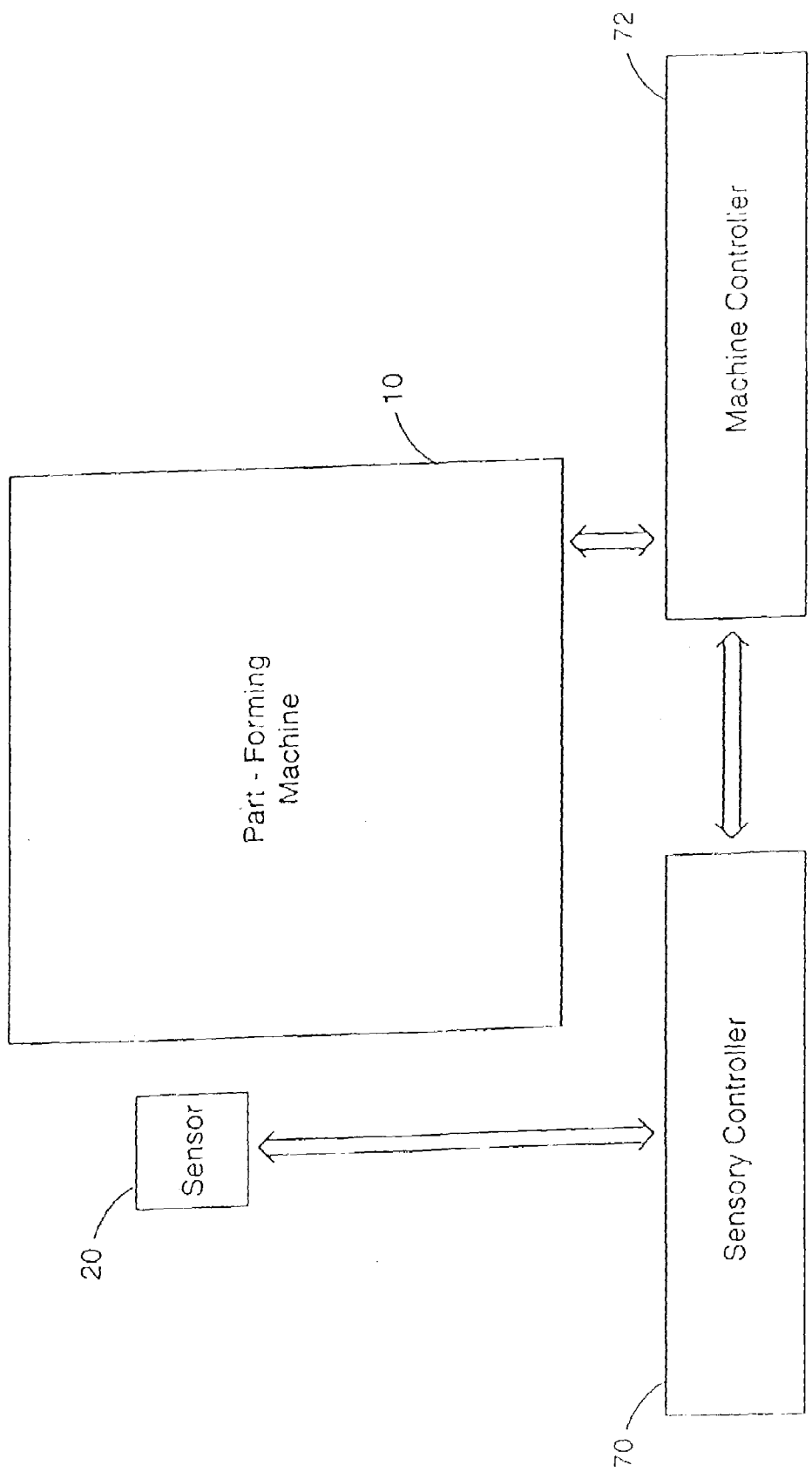
FIG. 6 is a functional block diagram of a prior-art machine controller and analyzing means.

More specifically, in the first state A illustrated in FIG. 4, the analyzing means 340 sends a mold close signal via the machine controller 72 or via any other data communication means to the injection molding machine 10. In response, a close/open mechanism that includes a ram actuator actuates the ram 38 to close and press mold half 16 against the mold half 14 and followed by actuation of the plastic extrude system 42 to inject liquid or molten plastic into the mold 12 to form a plastic part. After allowing sufficient time for the plastic to harden, the process advances as indicated by arrow 76 to state B in which the ram 38 is actuated to pull mold half 16 away from mold half 14. While the mold 12 is opening as illustrated in state B, an image of the open mold half 16 is acquired by sensor device 330 via capture source 310 and transmitted via electrical cable 78, or any other known transmitting means, to the analyzing means 340, which compares the image to an ideal image of the mold half 16 as it should appear with a properly formed plastic part 22 in the cavity. This comparison function of analyzing means 340 is indicated in FIG. 4 by decision block 80. At this point in the sequence, there should be a fully formed hard plastic part 22 in mold half 16. Therefore, if the comparison at decision block 80 indicates that no plastic part 22 is present in mold half 16 or that plastic part 22 is present but incompletely formed, the analyzing means 340 stops the sequence and generates a signal to an alarm 82 or other device as indicated by arrow 84, to signal an operator 86 to come and check the injection molding machine 10. However, if the comparison indicates that a fully formed plastic part 22 is present in the mold half 16, as it is supposed to be, the analyzing means 340 causes the sequence to continue, as indicated by arrow 88, to state C by sending a signal via the machine controller 72 to actuate the ejector system 18 to extend the ejector rods 56, 58 to cycle once to hit or push the hard plastic part out of the mold half 16. However, as discussed above, occasionally, one extension of ejector rods 56, 58 will not dislodge or clear the hard plastic part 22 from mold half 16. Therefore, the analyzing means 340 causes the sequence to proceed as indicated by arrow 90 to state D.

In state D, the analyzing means 340 acquires another image of the mold half 16 by sensor device 330 via capture source 310 and is transmitted via electrical cable 78, or any other known transmitting means and compares it, as indicated by decision block 92, to an ideal image, which is stored in memory, of the mold half 16 with the hard plastic part 22 removed and the mold cavity 50 (not seen in FIG. 4) empty. If the comparison at decision block 92 indicates that the part 22 is cleared and the cavity 50 is empty, the analyzing means 340 continues the sequence as indicated by arrow 94 back to state A by sending a signal via the machine controller 72 to actuate the ram 38 to again close the mold 12 and to actuate the extruder system 42 to again fill the mold 12 with plastic. On the other hand, if the comparison at decision block 92 indicates the part 22 is stuck in the mold half 16 as indicated by phantom lines 22' or otherwise not cleared, then the analyzing means 340 proceeds as indicated by arrow 96 to check the number of times that the ejector rods 56, 58 have been extended or cycled. If, as indicated at decision block 98, the ejector rods 56, 58 have been cycled more than some reasonable number, such as five (5), in unsuccessful tries to dislodge and clear the part 22 from the mold half 16, the analyzing means 330 stops the sequence, and, as indicated by arrow 100, proceeds to signal the alarm 82 or other device 86 to call the operator. However, if the number of tries has not exceeded the number, such as five (5), the analyzing means 340 returns the sequence to state C, as indicated by arrow 102, by signaling the ejector actuator via the machine controller 72 to again fire or cycle the ejector rods 56, 58 to hit or push the part 22 once again. The analyzing means 340 then continues the sequence again as indicated by arrow 90 to state D where another image of the mold half 16 is acquired with sensor device 330 and compared again at 92 to the ideal image of how the mold half 16 should appear with the part cleared. If the part 22 was successfully cleared by the last extension or cycle of the ejector pins 56, 58, the sequence proceeds as indicated by arrow 94 to state A. However, if the comparison at 92 indicates the part 22' is still stuck or not cleared, the analyzing means 340 checks the number of tries at 98 and, if not more than the number, e.g., five (5), returns the sequence to state C again. The maximum number of tries set in decision 98 can be any number, but it is preferably set at a number, for example five (5), that is deemed to allow enough cycles or extensions of ejector rods 56, 58 to reasonably be expected to dislodge and clear the part 22 without becoming practically futile. Thus, multiple cycles of extensions and retractions of the ejector rods 56, 58 are available and used when the part 22 gets stuck, but the invention prevents unneeded repetitive cycles of the ejector rods 56, 58 when the part 22 has been dislodged and cleared from the mold.

Figure 9:
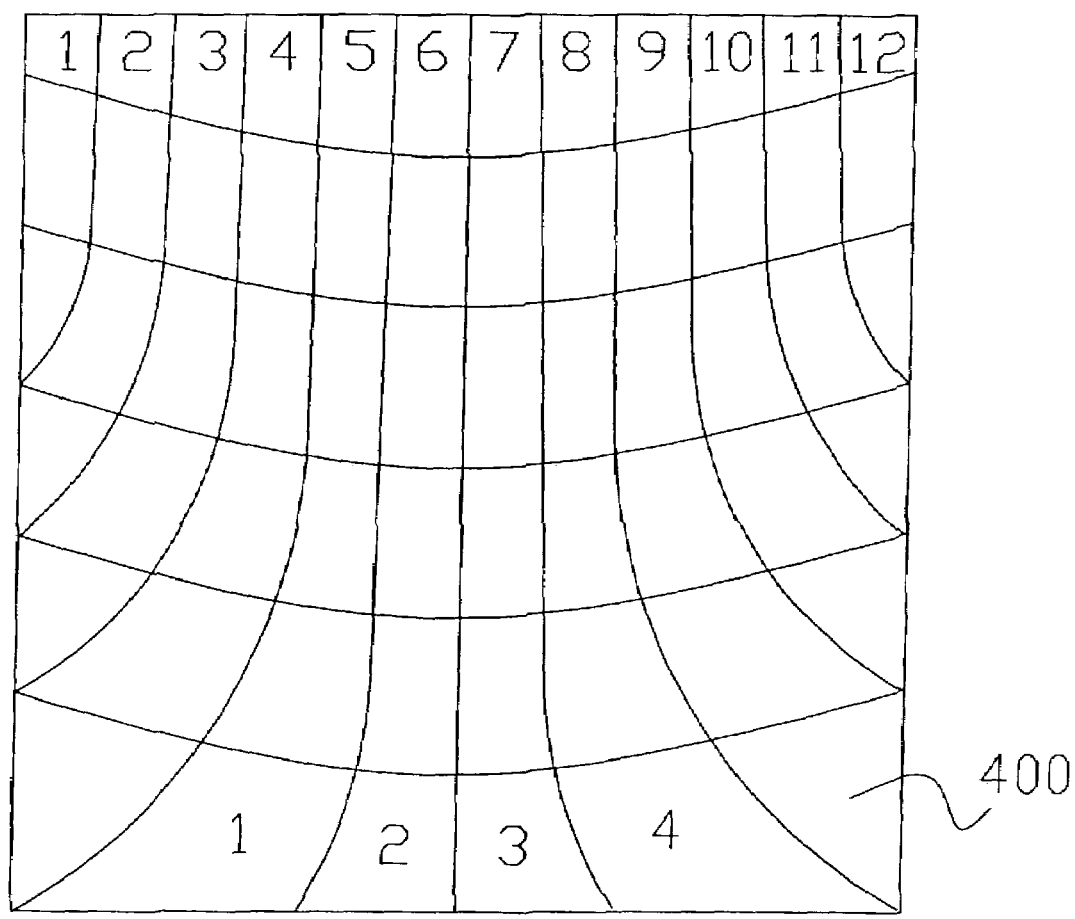
FIG. 9 is a plane view of a representative pixel grid area of a prior-art vision system showing the effects of a skewed view on pixel area.
Figure 10:
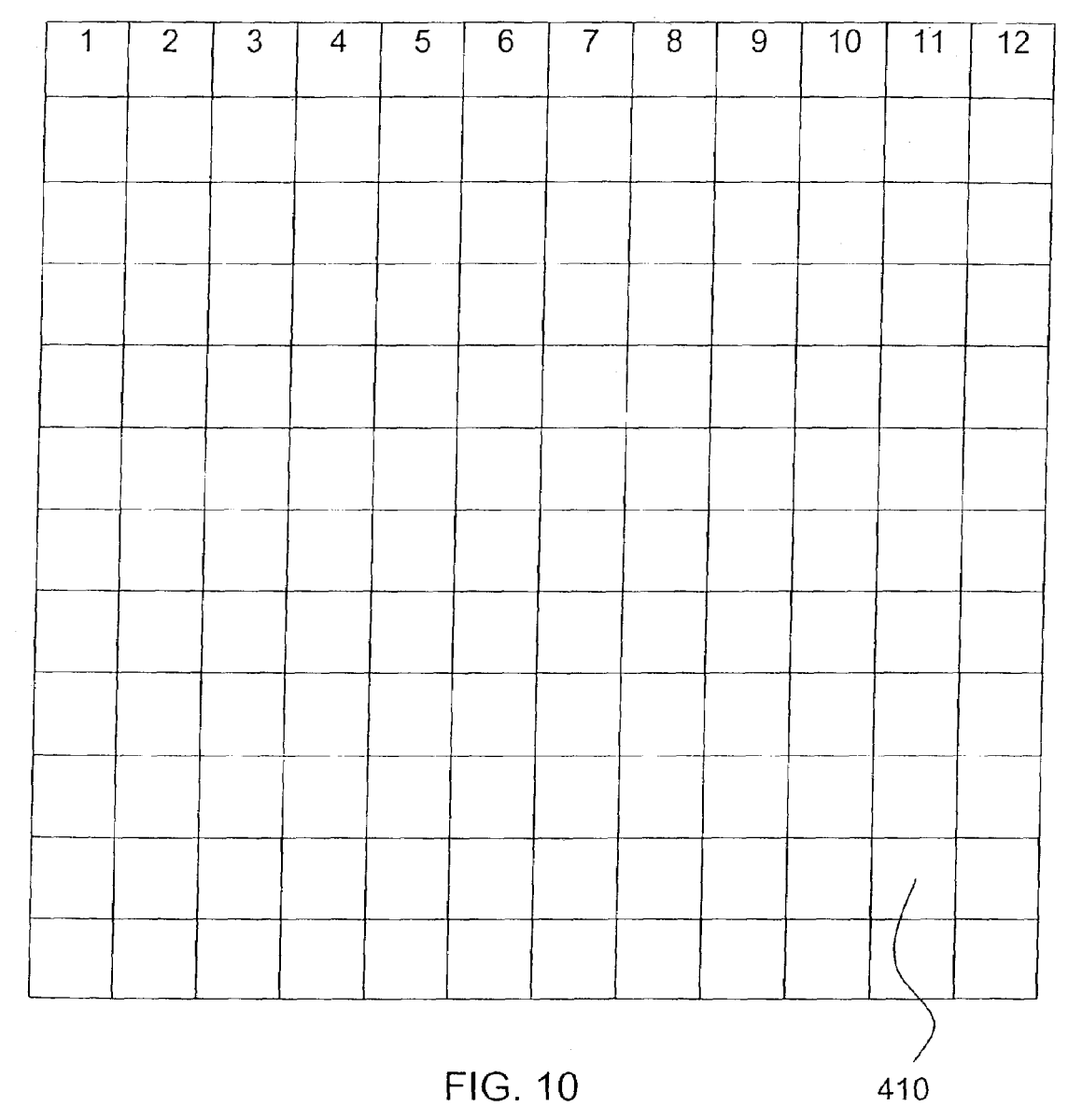

As previously discussed and as shown in FIG. 9, the prior-art method of placing the vision system on top of the mold results in a skewed view as the angle of the target increases relative to the camera. Consequently, a larger view area for each pixel 400 results thereby decreasing the resolution of the image. In the present invention, however, as shown in FIG. 10, the sensor or camera is held at a relatively parallel angle with the target, and as such, the view area for each pixel is smaller 410 and more consistent thereby resulting in an image having higher resolution. As a result, more accurate analysis can be made with images having better resolution.

In the preferred embodiment, the sensor device 330 has an illumination source that can travel via linking means 320 to the capture source 310 thereby directly illuminating the part 22 and/or mold 12 at a substantially parallel angle thereto. As a result, better lighting of the target area is possible thus increasing the clarity and accuracy of the acquired image. In an alternate embodiment, it is contemplated that there may be a separate illumination source attached in-line with the sensor device 330 or alternatively an illumination source that is independent therewith.

It should be noted that although the above in-mold sensor system is described in combination with a skip-eject system, the in-mold sensor system may be utilized with any part-forming machine. It should also be noted that any number of sensor devices 330 and/or capture sources 310 may be utilized.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

What is claimed is:

1. An imaging apparatus for assessing molded part status, comprising:
an image acquisition site within a part mold, said image acquisition site capable of acquiring a plurality of images of a plurality of part mold cavities, wherein each said image of said plurality of images is communicated to an analyzer apparatus for assessment of molded part status and wherein said assessment affects function of said part mold.

* * * * *